United States Patent [19]
Koyuba et al.

[11] Patent Number: 5,538,044
[45] Date of Patent: Jul. 23, 1996

[54] WELDED STEEL PIPE STEEL AND WELDED STEEL PIPE HAVING GOOD WEAR

[75] Inventors: Motofumi Koyuba; Naoki Konno; Noriaki Suzuki, all of Toukai, Japan

[73] Assignee: Nippon Steel Corporation, Tokyo, Japan

[21] Appl. No.: 539,162

[22] Filed: Oct. 4, 1995

Related U.S. Application Data

[63] Continuation of Ser. No. 42,679, Apr. 5, 1993, abandoned.

[51] Int. Cl.[6] .................................................. F16L 11/16
[52] U.S. Cl. ................ 138/140; 138/143; 138/DIG. 6; 148/337; 428/544
[58] Field of Search .................................. 138/140, 142, 138/143, 150, 151, 171, 177, DIG. 6; 428/544, 577, 615, 586; 148/337, 320

[56] References Cited

U.S. PATENT DOCUMENTS

| | | | |
|---|---|---|---|
| 1,306,690 | 6/1919 | Gillespie | 138/143 |
| 1,514,129 | 11/1924 | Clark | 138/143 |
| 4,016,008 | 4/1977 | MacKay et al. | 138/143 |
| 4,463,061 | 7/1984 | Otogura et al. | 138/143 |
| 4,505,232 | 3/1985 | Usami et al. | 138/143 |
| 4,536,455 | 8/1985 | Maeda et al. | 138/143 |
| 4,804,021 | 2/1989 | Hasegawa et al. | 138/171 |
| 4,943,489 | 7/1990 | Kuhara et al. | 138/143 |
| 5,265,793 | 11/1993 | Usui et al. | 138/143 |
| 5,275,893 | 1/1994 | Miyasaka et al. | 138/143 |

FOREIGN PATENT DOCUMENTS

| | | | |
|---|---|---|---|
| 62-270725 | 11/1987 | Japan . | |
| 63-108947 | 5/1988 | Japan . | |
| 2296090 | 12/1990 | Japan | 138/143 |
| 2296088 | 12/1990 | Japan | 138/143 |
| 2296091 | 12/1990 | Japan | 138/143 |

Primary Examiner—James E. Bryant, III
Attorney, Agent, or Firm—Wenderoth, Lind & Ponack

[57] ABSTRACT

Welded steel pipe having wear resistance properties, corrosion resistance and low-temperature toughness is provided by preparing welded steel pipe formed of composite steel material comprised of an outer layer of high-carbon, low-alloy steel and an inner layer having a relatively low carbon content, heating the pipe to a temperature that is not less than 800° C. and not more than 900° C. and then quenching the pipe so as to harden just the high-carbon outer layer, and if necessary this can be followed by reheating at a temperature of not less than 200° C. and not more than 600° C. to thereby produce a pipe with an inner layer having high corrosion resistance and low temperature toughness and an outer layer having high hardness.

2 Claims, 1 Drawing Sheet

WELDED STEEL PIPE STEEL AND WELDED STEEL PIPE HAVING GOOD WEAR

This application is a continuation of now abandoned application, Ser. No. 08/042,679, filed Apr. 5, 1993.

BACKGROUND OF THE INVENTION

1. Field of the Invention

The present invention relates to welded steel pipe steel and welded steel pipe having good inner surface wear resistance as required in such fields as oil and natural gas drilling and transportation, and to a method of manufacturing same.

2. Description of the Prior Art

In recent years the requirements for the wear resistance properties of the inner surface of steel pipe have been increasing. In drilling for oil and natural gas a considerable amount of the related exploitation work involves horizontal drilling operations. A problem that arises during such operations is that of damage to the inner surface of casing pipe from wear caused by contact between the drill pipe and the casing pipe. There is also a demand for slurry pipe having an inner surface that is more wear resistant.

Wear resistance can be effectively improved by increasing the hardness of the steel, as is disclosed by JP-A-62-270725. However, from the viewpoint of achieving both corrosion resistance and low-temperature toughness, hardening the whole of the steel pipe is undesirable. In recent years, thermal spraying of dissimilar metals and ceramics and the like, surface treatment processes and other such techniques for hardening just the surface region of steel pipe have been investigated but in each case have been found to lack sufficient productive efficiency.

SUMMARY OF THE INVENTION

An object of the present invention is to provide steel for welded steel pipe having good inner-surface wear resistance properties.

Another object of the present invention is to provide welded steel pipe that has an inner surface with good wear resistance properties.

DETAILED DESCRIPTION OF THE INVENTION

Figure 1:
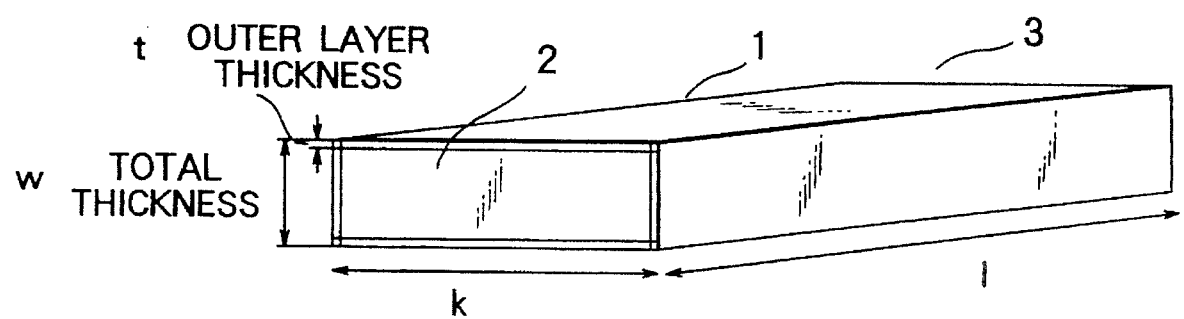
FIG. 1 is a perspective view of a composite slab.

The welded steel pipe steel having good wear resistance properties according to the present invention comprises an outer layer of high carbon, low alloy steel having good wear resistance properties comprising, by weight, 0.2 to 0.6 percent carbon and 0.1 to 3.0 percent manganese as basic components, and a low alloy inner layer comprising, by weight, 0.01 to 0.3 percent carbon and 0.1 to 3.0 percent manganese as the basic components, and containing one, two or more members selected from, by weight, 0.01 to 0.10 percent niobium, 0.01 to 0.10 percent vanadium, 0.05 to 0.50 percent molybdenum, and 0.005 to 0.10 percent titanium.

The present invention also comprises welded steel pipe having the composition described above.

The present invention further comprises a method for manufacturing welded steel pipe having good wear resistance by the steps of hot rolling a composite slab of the above composition to produce welded steel pipe steel, forming the steel thus produced into a round form, welding it to form welded steel pipe, heating the pipe to between 800° C. and 1000° C., and then cooling the pipe.

In accordance with this method two pouring nozzles of different lengths arc provided which extend into the mold, and steel with the inner-layer composition is poured from the longer submerged pouring tube and steel with the outer-layer composition is injected from the shorter immersion nozzle, and an electromagnetic force is applied that has the effect of suppressing mingling between the outer-layer and inner-layer components to thereby form a composite slab. It is to be understood that the composite slab formation process described above is not limitative, being no more than a representative example of a method of forming a composite slab which can be formed using any appropriate method.

As shown by FIG. 1, the composite slab is a slab 3 that has a length 1 and a width k, and an outer layer portion 1 and an inner layer portion 2 each having a different composition from the other. The outer layer portion 1 has a higher carbon component than the inner layer portion 2, which is an effective way of enabling the wear resistance to be improved without hardening of the whole pipe taking place. The thickness t of the outer layer can be set according to the thickness of the final product: generally a thickness in the order of 5 to 20 percent of the total thickness w will be appropriate.

Details of the invention will now be described. In accordance with the present invention, the welded steel pipe thus formed as a composite with an outer layer of high-carbon low alloy steel having good wear resistance, is heated at a temperature that is not less than 800° C. and not more than 900° C., and is then quenched so as to harden just the high-carbon outer layer. If required, it is also effective to follow the quenching step by reheating at a temperature of not less than 200° C. and not more than 600° C. Moreover, using a relatively low carbon composition for the inner layer makes it possible to avoid increasing the strength of the whole of the pipe more than is necessary, and thereby ensures the corrosion-resistance and low-temperature toughness properties.

The reason for the specific limitations on the constituent components of the steel of the invention will now be explained.

The aim of the composition of the outer layer is wear resistance based on hardness. If the hot-rolling conditions, the conditions of the cooling process that follows the rolling and the conditions of the heat treatment to which the pipe is subjected are all the same, it is considered to be the carbon content that will determine the degree of hardness that is obtained. For this invention the aim was to produce wear resistant pipe having a Vickers hardness of at least 400, for which a carbon content that is not less than 0.2 percent is required. However, a carbon content that exceeds 0.6 percent can result in cracking during the hot rolling, or during the pipe shaping process.

Manganese helps to increase the hardness of the steel. This hardening effect becomes too weak if the manganese content goes below the lower limit of 0.1 weight percent, and it costs more to make the steel. On the other hand, a manganese content that exceeds 3 percent degrades the steel pipe formability and increases costs. Although niobium, vanadium, molybdenum, titanium, copper, nickel, chromium or boron are not essential constituents of this invention, inasmuch as these elements contribute to the refinement of tile grain structure and improve the quench-hardenability, optionally they may be selectively added without departing from the gist of the invention. Aluminum or silicon also may be optionally added for deoxidization purposes, and calcium or zirconium may be added to control the shape and morphology of nonmetallic inclusions.

With respect to the composition of the steel of the inner layer, the basic premise is the ability to maintain the basic capabilities of oil-well pipe, slurry pipe and line pipe. Carbon is required for strength, and to ensure adequate strength at least 0.01 weight percent carbon is necessary. On the other hand, if the carbon content exceeds 0.30 weight percent it becomes difficult to ensure the requisite corrosion resistance and low-temperature toughness. Manganese is needed because it imparts strength to the steel. However, a manganese content that is below the lower limit of 0.1 weight percent is not enough to impart sufficient strength and also raises the cost of making the steel. On the other hand, a manganese content that exceeds 3 percent degrades the steel pipe formability, increases costs and, moreover, hardens the central segregation portion, causing degradation of the corrosion resistance and low-temperature toughness.

The addition of one, two or more members selected from niobium, vanadium, molybdenum, and titanium is effective for refining the grain structure and increasing the strength of the steel. Niobium has the effect of refining austenite grains during hot rolling, and of refining ferrite grains produced in the following transformation process, thereby improving the corrosion resistance and low-temperature toughness of the steel. To achieve these effects, at least 0.01 weight percent niobium must be added. However, as adding more than 0.10 weight percent niobium does not provide a further enhancement of those properties, 0.10 weight percent has been set as the upper limit.

Vanadium precipitates in the form of carbonitrides, following ferritic transformation, suppressing coarsening of ferrite grains, and as a precipitate also has a strengthening effect. These effects or vanadium are not manifested below the lower limit of 0.01 weight percent, while 0.10 weight percent has been set as the upper limit because adding more vanadium does not produce any further improvement in its effectiveness. Molybdenum is a solid solution hardening element that is useful for ensuring the strength of the steel. Molybdenum improves the strength without causing an accompanying degradation in corrosion resistance or low-temperature toughness. The lower limit of 0.05 weight percent for the molybdenum content has been set because the strengthening effect is small below that level. A molybdenum content that exceeds 0.50 weight percent provides more of an increase in strength than is required and also increases the cost of the steel.

Titanium precipitates in the form of carbonitrides and suppresses the coarsening of austenitic grains during the reheating of the slab prior to hot rolling and, following ferritic transformation, also suppresses coarsening of ferrite grains. Titanium does not manifest its effect at a content below the lower limit of 0.005 weight percent, while exceeding 0.10 weight percent titanium produces no additional effect, so 0.10 weight percent has been set as the upper limit.

Although copper, niobium and boron are not essential constituents of this invention, as they each help to improve the strength and quench-hardenability of the steel, optionally they may be selectively added without departing from the gist of the invention. Aluminum or silicon also may be optionally added for the purpose of deoxidization, and calcium or zirconium may be added to control the shape and morphology of nonmetallic inclusions. Moreover, in order to enhance corrosion resistance and low-temperature toughness, the harmful elements of phosphorus and sulfur should be minimized.

The hot-rolling conditions of the composite slab will now be described. While there are no particular limitations on the heating conditions, in setting these conditions the solid solution of added alloying elements has to be taken into consideration. While there are also no particular limitations relating to finish rolling temperature or cooling rate following finish rolling, when setting these, the composition of the outer and inner layers has to be taken into account, together with the overall target strength, corrosion resistance and low-temperature toughness.

The hot-rolled sheet is formed and welded to form steel pipe, which is then heat-treated using the following conditions. It is necessary to heat the steel to the austenite temperature region, so the lower temperature limit was set at 800° C. The upper limit was set at 1000° C., as a higher temperature can result in cracks forming during cooling.

While there are no particular restrictions relating to cooling rate or the temperature at which the cooling is stopped, a cooling rate of at least 10° C. is desirable for effective hardening of the outer layer. It is preferable to stop the cooling at around 40° C. or below to avoid softening caused by reheating. An actual cooling rate and temperature at which cooling is stopped will vary according to the properties being sought (wear-resistance) and composition of the steel, and should be selected appropriately. If required, cooling can be effectively followed by reheating. Steel that has been rapidly cooled may be too hard if used as is; the hardness can be adjusted by reheating, which is to say, by tempering the steel. A temperature of below 200° C. has no tempering effect while exceeding 600° C. could cause softening of the outer layer portion, so for the above purpose the temperature range has been set at not less than 200° C. and not more than 600° C.

The present invention has made it possible to produce steel pipe having good wear-resistance without hardening (strengthening) the pipe more than necessary. The present invention also offers high productivity and manufacturing costs.

Example 1

In Table 1, A, B, C and D are steel pipes produced according to the present invention. Specifically, A, B, C and D are each steel pipes having good wear resistance obtained by rolling composite slabs to produce steel pipe having an outer layer that was hardened without hardening (strengthening) the whole of the pipe more than necessary. Single-layer pipes E and F are comparative examples. Although E has a high carbon content, it has insufficient hardness. On the other hand, F has high hardness and therefore good wear-resistance, but the overall pipe has been hardened (strengthened) more than necessary, which makes it unsuitable for practical application.

TABLE 1

| Item | | Chemical composition (wt %) | | | | | | Slab thickness | | Pipe dimensions | | Hardness |
|---|---|---|---|---|---|---|---|---|---|---|---|---|
| | | C | Mn | Nb | V | Mo | Ti | Total thickness (mm) | Outer layer thickness (mm) | Outer diameter (mm) | Thickness (mm) | (Hv10 kg) |
| Inventive | | | | | | | | | | | | |
| A | Outer layer | 0.32 | 1.14 | — | — | — | — | 170 | 17 | 244.5 | 12.0 | 320 |
| | Inner layer | 0.11 | 1.36 | 0.049 | — | — | 0.015 | | | | | 228 |
| B | Outer layer | 0.35 | 1.10 | — | 0.042 | — | — | 170 | 15 | 177.8 | 11.5 | 435 |
| | Inner layer | 0.18 | 1.04 | — | — | — | 0.025 | | | | | 238 |
| C | Outer layer | 0.23 | 1.35 | — | 0.032 | 0.32 | — | 170 | 28 | 273.1 | 8.7 | 305 |
| | Inner layer | 0.04 | 1.36 | 0.035 | — | — | — | | | | | 185 |
| D | Outer layer | 0.42 | 1.36 | — | — | 0.32 | — | 170 | 17 | 139.7 | 10.5 | 368 |
| | Inner layer | 0.19 | 1.48 | 0.038 | 0.032 | 0.32 | — | | | | | 275 |
| Comparative | | | | | | | | | | | | |
| E | Single layer | 0.48 | 1.25 | — | — | — | — | 245 | — | 244.5 | 12.5 | 235 |
| F | Single layer | 0.25 | 1.25 | — | — | 0.24 | 0.025 | 245 | — | 177.5 | 11.5 | 305 |

Example 2

In Table 2, 1 to 8 are inventive examples, produced by rolling composite slabs and welding the rolled steel to form pipes. Each pipe was then subjected to heat-treatment to effectively harden the high-carbon-component outer layer portion without hardening (strengthening) the whole pipe more than necessary to thereby obtain welded steel pipe having good wear resistance.

In Table 2, 9 and 10 are single-layer pipes used as comparative examples. Because of its low carbon content, 9 has insufficient hardness. Because of the high carbon content of 10, the heat treatment imparts a high degree of hardness that renders the pipe unsuitable for practical application.

TABLE 2

| | | Chemical composition (wt %) | | | | | | Slab thickness | |
|---|---|---|---|---|---|---|---|---|---|
| | | C | Mn | Nb | V | Mo | Ti | Total thickness (mm) | Outer layer thickness (mm) |
| Inventive | | | | | | | | | |
| 1 | Outer layer | 0.33 | 1.44 | — | — | — | — | 180 | 18 |
| | Inner layer | 0.09 | 1.32 | — | — | — | — | | |
| 2 | Outer layer | 0.41 | 1.05 | — | — | — | — | 200 | 20 |
| | Inner layer | 0.11 | 1.24 | 0.035 | — | — | — | | |
| 3 | Outer layer | 0.55 | 0.86 | — | — | — | — | 180 | 20 |
| | Inner layer | 0.05 | 0.88 | 0.041 | 0.032 | — | — | | |
| 4 | Outer layer | 0.24 | 1.98 | — | — | — | — | 200 | 25 |
| | Inner layer | 0.03 | 0.75 | 0.054 | 0.022 | 0.24 | — | | |
| 5 | Outer layer | 0.45 | 0.93 | — | — | — | — | 170 | 20 |
| | Inner layer | 0.12 | 1.33 | 0.043 | — | — | — | | |
| 6 | Outer layer | 0.35 | 2.23 | — | — | — | — | 220 | 30 |
| | Inner layer | 0.14 | 1.55 | — | 0.034 | 0.27 | 0.015 | | |
| 7 | Outer layer | 0.44 | 1.56 | — | — | — | — | 250 | 25 |
| | Inner layer | 0.10 | 1.23 | 0.027 | — | 0.35 | 0.016 | | |
| 8 | Outer layer | 0.31 | 1.67 | — | — | — | — | 220 | 25 |
| | Inner layer | 0.06 | 1.00 | 0.024 | 0.031 | 0.32 | 0.016 | | |
| Comparative | | | | | | | | | |
| 9 | Single layer | 0.12 | 1.33 | — | — | — | — | 250 | — |
| 10 | Single layer | 0.42 | 0.92 | 0.021 | — | — | — | 250 | — |

| | | Pipe dimensions | | Heating conditions (hardening) | | | Reheating | |
|---|---|---|---|---|---|---|---|---|
| | | Outer diameter (mm) | Thickness (mm) | Temperature (°C.) | Cooling rate (°C./s) | Cooling stopped at: (°C.) | temperature (tempering) (°C.) | Hardness (10 kg) |
| Inventive | | | | | | | | |
| 1 | Outer layer | 244.5 | 12.0 | 830 | 35 | 300 | — | 425 |
| | Inner layer | | | | | | | 221 |
| 2 | Outer layer | 244.5 | 12.0 | 890 | 55 | 100 | — | 430 |
| | Inner layer | | | | | | | 225 |

TABLE 2-continued

| | | | | | | | | |
|---|---|---|---|---|---|---|---|---|
| 3 | Outer layer | 244.5 | 12.0 | 900 | 45 | 100 | — | 489 |
| | Inner layer | | | | | | | 243 |
| 4 | Outer layer | 177.8 | 11.5 | 920 | 32 | 380 | — | 455 |
| | Inner layer | | | | | | | 213 |
| 5 | Outer layer | 273.1 | 8.7 | 900 | 70 | 100 | 300 | 405 |
| | Inner layer | | | | | | | 200 |
| 6 | Outer layer | 244.5 | 10.0 | 850 | 55 | 200 | 250 | 410 |
| | Inner layer | | | | | | | 191 |
| 7 | Outer layer | 139.7 | 10.5 | 880 | 50 | 100 | 350 | 412 |
| | Inner layer | | | | | | | 175 |
| 8 | Outer layer | 244.5 | 12.0 | 950 | 80 | 200 | 450 | 428 |
| | Inner layer | | | | | | | 189 |
| Comparative | | | | | | | | |
| 9 | Single layer | 244.5 | 12.0 | 950 | 50 | 100 | — | 210 |
| 10 | Single layer | 244.5 | 12.0 | 950 | 80 | 100 | — | 450 |

What is claimed is:

1. A composite steel having good wear resistance properties comprising:
a high carbon, low alloy steel outer layer having good wear resistance properties consisting essentially of, by weight, from more than 0.4 to 0.6 percent carbon, 0.1 to 3.0 percent manganese, and a balance consisting essentially of iron, and
a low alloy steel inner layer consisting essentially of, by weight, 0.01 to 0.3 percent carbon, 0.1 to 3.0 percent manganese, one or more members selected from the group consisting of, by weight, 0.01 to 0.10 percent niobium, 0.01 to 0.10 percent vanadium, 0.05 to 0.50 percent molybdenum, 0.005 to 0.10 percent titanium, and a balance consisting essentially of iron.

2. Welded steel pipe formed of the composite steel according to claim 1.

* * * * *